(12) United States Patent
Froehner et al.

(10) Patent No.: US 10,073,429 B2
(45) Date of Patent: Sep. 11, 2018

(54) METHOD, COMPUTATION APPARATUS, USER UNIT AND SYSTEM FOR PARAMETERIZING AN ELECTRICAL DEVICE

(71) Applicant: SIEMENS AKTIENGESELLSCHAFT, Munich (DE)

(72) Inventors: Wiebke Froehner, Amberg (DE); Thomas Werner, Rednitzhembach (DE)

(73) Assignee: Siemens Aktiengesellschaft, Munich (DE)

( * ) Notice: Subject to any disclaimer, the term of this patent is extended or adjusted under 35 U.S.C. 154(b) by 270 days.

(21) Appl. No.: 15/071,436

(22) Filed: Mar. 16, 2016

(65) Prior Publication Data

US 2016/0274557 A1 Sep. 22, 2016

(30) Foreign Application Priority Data

Mar. 16, 2015 (EP) ..................................... 15159216

(51) Int. Cl.
*G05B 19/042* (2006.01)
*G05B 19/05* (2006.01)

(52) U.S. Cl.
CPC ......... *G05B 19/0426* (2013.01); *G05B 19/05* (2013.01); *G05B 2219/23258* (2013.01)

(58) Field of Classification Search
CPC ................ G05B 19/0426; G05B 19/05; G05B 2219/23258
See application file for complete search history.

(56) References Cited

U.S. PATENT DOCUMENTS 5,703,950 A * 12/1997 Jovanovich .............. H04K 3/20
380/249
9,535,685 B1 * 1/2017 Wang ........................ G06F 8/65
2001/0043686 A1 11/2001 Lggulden
(Continued)

FOREIGN PATENT DOCUMENTS

CN 1344393 A 4/2002
CN 101739007 A 6/2010
(Continued)

*Primary Examiner* — Mark Connolly
(74) *Attorney, Agent, or Firm* — Laurence Greenberg; Werner Stemer; Ralph Locher

(57) ABSTRACT

In a method for parameterizing an electrical device, a communication link is set up between a user unit and a computation apparatus. The latter provides a parameterization program for parameterizing the electrical device. The user unit is used to record settings made at the user end that affect the electrical device, and the recorded settings are used to form setting values for parameterizing the electrical device. A parameterization file containing the setting values is produced for the electrical device. In order to be able to perform parameterization of electrical devices, in particular electrical devices that are used in automation installations in a safety-critical environment, in a comparatively simple and inexpensive manner, the parameterization program for parameterizing the electrical device is executed by the computation apparatus and a user interface for the parameterization program is displayed by the user unit.

14 Claims, 6 Drawing Sheets

(56) References Cited

U.S. PATENT DOCUMENTS

| | | | | |
|---|---|---|---|---|
| 2007/0206740 | A1* | 9/2007 | Iggulden | G05B 15/02 379/102.03 |
| 2008/0250236 | A1 | 10/2008 | Bauereiss et al. | |
| 2010/0131084 | A1 | 5/2010 | Van Camp | |
| 2010/0318686 | A1* | 12/2010 | Ver Steeg | H04L 12/66 710/8 |
| 2011/0125342 | A1 | 5/2011 | Lang et al. | |

FOREIGN PATENT DOCUMENTS

| | | |
|---|---|---|
| CN | 101785165 A | 7/2010 |
| CN | 102403034 A | 4/2012 |
| DE | 10253062 B4 | 11/2004 |
| EP | 1929382 B1 | 5/2010 |

* cited by examiner

METHOD, COMPUTATION APPARATUS, USER UNIT AND SYSTEM FOR PARAMETERIZING AN ELECTRICAL DEVICE

CROSS-REFERENCE TO RELATED APPLICATION

This application claims the priority, under 35 U.S.C. § 119, of European patent application EP 15159216.9, filed Mar. 16, 2015; the prior application is herewith incorporated by reference in its entirety.

BACKGROUND OF THE INVENTION

Field of the Invention

The invention relates to a method for parameterizing an electrical device, in which a communication link is set up between a user unit and a computation apparatus, wherein the computation apparatus provides a parameterization program for parameterizing the electrical device, the user unit is used to record settings made at the user end that affect the electrical device, and the recorded settings are used to form setting values for parameterizing the electrical device, and a parameterization file containing the setting values is produced for the electrical device.

The invention also relates to a computation apparatus for parameterizing an electrical device, a user unit for parameterizing an electrical device and to a system having a computation apparatus and a user unit.

Before entering an operating state, an electrical device usually needs to be adjusted to suit the purpose by the user of the device by making settings that are required by the user. By way of example, it is necessary to make stipulations regarding a device name, an association between the device and other devices or organizational units, communication settings and/or operating parameters that define the behavior of the electrical device during operation thereof. Such a process is also referred to as parameterization of the electrical device.

In this connection, electrical devices may be particularly devices of an automation installation, e.g. sensors, actuators, fault indicators, measuring instruments, protective devices, controllers or communication apparatuses (routers, switches, hubs, bridges). The automation installation can be used for control, observation, monitoring, for protection and/or for regulation of industrial processes and installations, production and manufacturing installations, public and private facilities (e.g. buildings, traffic systems) or distribution and transport systems (e.g. for electric power, solid matter, oil, gas, water, air, etc.). In addition, however, any other electrical devices, e.g. devices from the consumer domain, may also be the subject matter of a parameterization.

The invention is explained below using the example of an automation installation for an electrical installation, such as e.g. an electrical power supply system or an electrical switching station in a power supply system. Such an electrical installation can comprise single components, for example in the form of lines and cables, switches, transformers, generators, motors, converters, loads, electrical energy generators, etc. Electrical devices in such an automation installation are usually arranged in physical proximity to single components of the electrical installation and, by way of example, are used to record measured values that describe a state of the respective components of the installation, or to influence states of respective components of the installation. In this connection, the electrical devices may be, by way of example, sensors, e.g. sensors for measuring electrical variables (e.g. current, voltage), temperature sensors, flow rate sensors, flow sensors, etc., or actuators, e.g. actuating elements, switch controllers, valves, etc. Furthermore, electrical devices may also be intelligent devices (e.g. what are known as IEDs—intelligent electronic devices) that, when particular algorithms are executed, automatically perform tasks for automating the installation (e.g. what are known as fault indicators, which measure a current flowing in a line and send an alarm signal if a threshold value is exceeded). In this connection, IEDs may be particularly protective devices and controllers, measuring instruments, power quality instruments or power measuring instruments (power meters). Electrical devices in such an automation installation may also be communication devices (routers, switches, etc.) that are used for transmitting messages in a communication system of the automation installation.

The exemplary explanation below is therefore not intended to be understood to be restrictive; all observations can therefore also be transferred to other electrical devices in corresponding fashion.

In recent years, the automation of electrical power supply systems has increased to an ever greater extent. This is because while power supply systems have previously been extensively equipped with automation systems largely only in the high-voltage and sometimes also in the medium-voltage domain, increased efforts are lately being made to automate even distribution systems at the medium-voltage and low-voltage levels to a greater extent. System operators expect this to lead particularly to a reduction in downtimes. Furthermore, existing power supply systems, particularly also at distribution level, need to be readied for a constantly increasing supply of electric power by local generating installations (e.g. wind power, photovoltaics, biomass power stations, etc.). As a consequence, automation systems are obtained that are distinguished primarily by their comprising a very large number of electrical devices, particularly actuators and sensors, being physically distributed over large areas and collecting a large number of data.

Automation solutions that are designed on the basis of a conventional model having few central control stations and controllers and distributed automation devices or telecontrol units connected thereto require a high level of installation and parameterization complexity. On account of the large number of devices in future automation installations, the question arises as to how the requisite parameterization of the devices can be performed as simply and with as little complexity as possible.

Previous systems for parameterizing electrical devices generally use a parameterization device that is specifically tailored to the electrical device that is to be parameterized. In this connection, the parameterization device usually executes a parameterization program specific to the electrical device that is to be parameterized and—in interaction with a user prescribing settings—produces a set of parameters that is then transferred to the electrical device. Such a parameterization device is known, for example, from commonly assigned, published patent application US 2008/0250236 A1 and its counterpart European patent specification EP 1929382 B1.

If the devices to be parameterized have dedicated input and display options (e.g. keys and a display), parameterization can in some cases also be performed directly in situ on the device; in this case, a parameterization device is effectively integrated in the electrical device. This requires the electrical device to have not only its operating software but also the parameterization program suitable for parameterization.

Both separate parameterization devices and parameterization devices integrated in the device have the requirement that the parameterization programs that need to be used be kept up to date on multiple units, which produces a high level of maintenance complexity.

A method for parameterizing an electrical device of the type cited at the outset is also known from the German patent specification DE 10253062 B4. The known method involves electrical devices in the form of protective devices and field devices being parameterized by means of a user unit in the form of a computer (e.g. an engineering workstation). In order to keep the parameterization program that is to be used for parameterization constantly up to date, the user unit is connected to a computation apparatus in the form of a server for parameterization applications and, prior to a parameterization process, loads the parameterization program that is appropriate to the device. It is then possible for the user unit to be used to perform the parameterization and to transfer parameter settings for completing the parameterization of the device to the device.

The known methods therefore always involve the existence of a direct communication link between the electrical device and the user unit. Besides high technical demands, for example the provision of a special, if need be even wireless, parameterization interface on the electrical device for setting up the communication link to the user unit, this also gives rise to a security risk, since such a parameterization interface can also be used by unauthorized circles to gain access to the electrical devices. Furthermore, as illustrated, the known systems require a comparatively high level of maintenance complexity that rises with the number and diversity of electrical devices that are to be parameterized.

SUMMARY OF THE INVENTION

It is accordingly an object of the invention to provide devices and methods which overcome the above-mentioned and other disadvantages of the heretofore-known devices and methods of this general type and which provide for a method that can be used in a comparatively simple and inexpensive manner to parameterize electrical devices, in particular electrical devices that are used in automation installations in a security-critical environment.

It is a further object to specify a corresponding computation apparatus, a corresponding user unit and a corresponding system for parameterizing such electrical devices.

With the foregoing and other objects in view there is provided, in accordance with the invention, a method for parameterizing an electrical device, the method which comprises:

establishing a communication link between a user unit and a computation apparatus, and providing with the computation apparatus a parameterization program for parameterizing the electrical device;

executing the parameterization program for parameterizing the electrical device by the computation apparatus;

displaying a user interface for the parameterization program at the user unit and acquiring with the user unit settings made at a user end that affect the electrical device; and using the acquired settings to form setting values for parameterizing the electrical device, and producing a parameterization file containing the setting values for the electrical device.

In other words, the objects of the invention are achieved by way of a method of the type cited at the outset in which the parameterization program for parameterizing the electrical device is executed by the computation apparatus, with a user interface for the parameterization program being displayed by means of the user unit.

By way of example, the user unit may be a portable computer (notebook, laptop, tablet, PDA, etc.) or a mobile communication device (mobile telephone, smartphone, etc.). However, the user unit may also be a static data processing apparatus, e.g. a workstation.

The computation apparatus may be a single or a plurality of data processing apparatus(es) (computer, server, etc.) that interact(s) in a suitable manner to perform the parameterization program. Preferably, the computation apparatus and the electrical device have a wired or wireless communication link between them. This may be permanently in place or set up as required. The computation apparatus may additionally have an interface to an operating and observation station (e.g. a computer in a control center, or a workstation) in order to be able to present data relating to the electrical device and/or delivered thereby to the operator of the electrical device.

The user unit can set up a wireless (e.g. using WLAN, WiFi, etc. or mobile radio, e.g. GSM, GPRS, UMTS, LTE, etc.) or wired (e.g. using a wired LAN or a wired telephone connection) communication link to the computation apparatus. Since only small volumes of data need to be transmitted between the user unit and the computation apparatus, there are no particularly high demands made on the communication link.

The method according to the invention therefore involves the execution that the prior art discloses for a parameterization program being relocated from the user unit to the computation apparatus, but with the computation apparatus and the user unit interacting such that a user interface for the parameterization program is displayed by the user unit and the user is able to make settings that are necessary for parameterizing the electrical device using the user unit. This solution firstly has the advantage that neither the user unit nor the electrical device itself needs to provide the parameterization program. Particularly for a large diversity of electrical devices to be parameterized, which would accordingly require a large diversity of parameterization programs, it is possible for provision and maintenance of the required parameterization programs to be accomplished in a much simpler manner on the computation apparatus than on every single user unit. In addition, there are only low demands made on memory space and computation capacity in the user unit, since the complex program steps are performed by the computation apparatus. The user unit merely needs to be set up to display the user interface and record settings by the user. Since the user unit merely needs to be capable of displaying a user interface for a parameterization program running on the computation apparatus and of recording inputs by the user in this regard, it is sufficient if the user unit executes a comparatively simple program for this purpose. This may be e.g. a browser that is used to display a web page, provided by the computation apparatus, for recording settings for the electrical device. The user unit may alternatively have any other program, e.g. what is known as an "APP", provided on it that is designed to display the user interface.

A further advantage is that it is not necessary for there to be a communication link between the user unit and the electrical device to be parameterized. This significantly reduces the opportunity for unauthorized access to the electrical device.

Following the parameterization of the electrical device, the latter can, during operation, pick up further data, e.g. measured values, status values, event values, etc., and send them to the computation apparatus. The computation apparatus stores the data in question, so that the electrical device itself does not need to provide a particularly large memory space.

In one advantageous embodiment of the method according to the invention, the execution of the parameterization program prompts the computation apparatus to transmit first data, which are suitable for producing the user interface for the parameterization program, to the user unit, the user unit is used to use the received first data to produce and display the user interface for recording the user settings, second data, which indicate the recorded settings made by the user, are transmitted from the user unit to the computation apparatus, the computation apparatus is used to use the received second data to form the setting values for the electrical device, and the computation apparatus is used to use the formed setting values to produce the parameterization file.

The first data transmitted from the computation apparatus to the user unit may be e.g. data in a data format that can be displayed by a browser (e.g. HTML, XML). The same data format can also be used to transmit the settings in the form of the second data to the computation apparatus.

The settings recorded by the user unit may be e.g. a name of the device, a name of a station in which the device is operated, designations for primary components to which the device is connected (e.g. an electrical line on which the device picks up measured values), communication addresses or operating parameters (e.g. threshold values for comparing measured values). Furthermore, provision may be made for the settings recorded by the user unit to comprise a geoinformation item indicating the geographical location at which the electrical device is operated. The reason is that, for a series of work processes in automation systems, it is important for the operator to know at what geographical position a device is installed. This is important in the case of the fault indicators on medium-voltage overhead lines, for example, which send a fault signal in the event of an overcurrent. If the geographical installation location is known, the operator can, in the event of faults, drive to the affected fault location more quickly and rectify a fault. To this end, it is either possible for the geoinformation item (e.g. in the form of geocoordinates) to be input in the user unit manually by the user or for the user unit to use a geosensor (e.g. a GPS module) to perform position-finding for the installation location and to adopt the associated geoinformation item directly in the settings and transmit it to the computation apparatus.

Provision may be made for the parameterization file with the setting values for the electrical device to be provided exclusively on the computation apparatus and for the electrical device to access these setting values as needed while it is operating.

According to one advantageous embodiment of the method according to the invention, however, provision may also be made for at least portions of the parameterization file to be transmitted from the computation apparatus to the electrical device.

Hence, the setting values required for operation of the electrical device can be stored directly in the electrical device as the result of the parameterization process and used locally in said electrical device for operation.

According to a further advantageous embodiment of the method according to the invention, provision may additionally be made for the user unit to be used to record an identification information item for the electrical device, for the identification information item of the electrical device to be transmitted from the user unit to the computation apparatus, and for the computation apparatus to adjust the parameterization program using the identification information item such that it is suitable for parameterizing the device, or to select, from a plurality of parameterization programs, one that is suitable for parameterizing the device.

In this manner, the computation apparatus, particularly when there are a large number of different electrical devices to be parameterized, can easily provide a respective parameterization program that is suitable for parameterizing the electrical device. This is because the computation apparatus recognizes what device is involved from the identification information item and can either select the parameterization program appropriate to the electrical device from multiple parameterization programs or adjust a universal parameterization program such that it is suitable for parameterizing the electrical device by virtue of e.g. only the setting options that are appropriate to the electrical device being provided.

By way of example, the identification information item of the electrical device may be a device designation, a serial number, a device type, etc. By way of example, the identification information item can be input into the user unit manually by the user. However, it is regarded as particularly advantageous if the electrical device provides the identification information item in the form of an optically recordable code, and the user unit records the code by means of an optical sensor and ascertains the identification information item therefrom. By way of example, the optically recordable code may be a bar code or QR code (QR=Quick Response) that is printed or adhesively bonded on the electrical device and recorded using an optical reading device (e.g. a camera) of the user unit. The code can also be displayed on any available display of the electrical device. The user unit uses inherently established methods to ascertain the identification information item of the electrical device from the code and transmits said identification information item to the computation apparatus.

Besides the selection of the suitable parameterization software for the electrical device, the computation apparatus also uses the identification information item to register the electrical device for operation. By way of example, this is because the computation apparatus can perform not only the parameterization program but also a control and monitoring program for an electrical power supply system, the electrical device being part (e.g. a sensor or an actuator) of an automation installation for the power supply system. In this connection, provision may be made for the electrical device to transmit data to the computation apparatus during operation. By way of example, said data may be measured values, status values, event reports, diagnosis data, etc. that indicate a state of the electrical device itself and/or of a component connected thereto (e.g. an electrical line or another primary component in an electrical power supply system). Furthermore, during operation of the electrical device, provision may be made for said electrical device to receive data from the computation apparatus. By way of example, these data may be commands, control data, software updates or amended parameters. The registration of the electrical device with the computation apparatus by means of the identification information item is therefore the basis for operation of the electrical device in interaction with the computation apparatus. Only after successful registration during the initial parameterization does the computation apparatus know the electrical device and therefore know what data it can receive from the device and what data need to be sent to the device.

Furthermore, provision may be made for the computation apparatus to use the identification information item to ascertain further information items relating to the electrical device. In particular, said information items include static data that indicate the device type, a device documentation, available functions of the device, a manufacturer of the device or online links to support and update files for the device. These information items do not need to be input manually by the user using the user unit in this case, but rather are ascertained by the computation apparatus automatically on the basis of the identification information item. To this end, the computation apparatus can comprise a database, for example, with all the usual devices that can be provided for parameterization. Advantageously, the database is designed to use at least one component of the identification information item to ascertain at least general information items (e.g. type, manufacturer, version) for the electrical device.

In accordance with a further advantageous embodiment of the method according to the invention, the computation apparatus is provided in a data processing cloud.

In this context, a data processing cloud is intended to be understood to mean an arrangement having one or more data memory apparatuses and one or more data processing apparatuses that can be designed to perform arbitrary data processing processes by dint of suitable programming. In this context, the data processing apparatuses are normally universal data processing apparatuses (e.g. servers) that initially have no kind of specific interpretation in terms of their design and their programming. Only programming that is performed can prepare the universal data processing apparatus for carrying out specific functions. If the data processing cloud has multiple single components, these are connected to one another in a suitable manner for data communication (e.g. by a communication network). A data processing cloud can be supplied with arbitrary data for data storage and/or processing. The data processing cloud itself makes the stored data and/or the results of the data processing performed available in turn to other devices, e.g. a computer workstation connected to the data processing cloud. By way of example, a data processing cloud can be provided by a computer center or even multiple networked computer centers. Usually, a data processing cloud is formed physically remotely from the installation.

In this case, the data processing cloud can be operated by the same operator as the electrical device, for example. By way of example, it could be a server installation or a computer center of the installation operator. Alternatively, provision may be made for the data processing cloud to be associated with a different operator than the operator of the electrical device. This can have the advantage for the operator of the electrical device, particularly if many electrical devices need to be operated, that it need not concern itself with the operation and maintenance of the data processing cloud, but rather has transferred these tasks to the operator of the data processing cloud, which said operator provides as a service.

In a further advantageous embodiment of the method according to the invention, the user unit stores an explicit digital operator key associated with the operator of the electrical device, and the user unit sends the key to the computation apparatus, and the computation apparatus uses the operator key to store the setting values and/or the parameterization file and/or further information items relating to the electrical device and/or data received from the electrical device during operation in encrypted form. Alternatively, provision may be made for the user unit to store an explicit digital operator key associated with the operator of the electrical device and for the user unit to send the key to the computation apparatus, and for the computation apparatus to store the setting values and/or the parameterization file and/or further information items relating to the electrical device and/or data received from the electrical device during operation in an area that is access-protected using the operator key.

In this manner, the data connected to the electrical device—both the setting values used for parameterization and any other data, e.g. operating data such as measured values, etc.—can be protected on the computation apparatus against unauthorized access operations. This is accomplished using the operator key either by encrypting the respective data or by protecting a data area that is reserved for data that are associated with the operator of the electrical device against unauthorized access operations. Such a measure is necessary particularly when the computation apparatus is formed in a data processing cloud that is used to manage devices of multiple operators. Appropriate protection of the data or data areas can ensure that only the operator that has its operator key can access the data of its electrical device.

An operator key may either be stored on the user unit in advance, be stored following user input or be distributed to the user unit by an allocation method, for example an allocation method from the field of online banking (e.g. mTAN).

In order to increase security against unauthorized access still further, provision may also be made in this connection for acquisition of a new electrical device by the operator to prompt the computation apparatus to logically combine an identification information item of the new electrical device with an operator key of the operator and to store them, and for parameterization of the new electrical device to prompt the computation apparatus to accept only such settings for the new electrical device as come from a user unit that has the same operator key.

In this case, the electrical device is sold to the operator by a sales platform that is supported at least to some extent by means of electronic data processing. The computation apparatus is connected to the sales platform or even forms such a sales platform itself. The sale of a new electrical device prompts the identification information item thereof to be logically combined directly with the operator key of the operator and prompts the pair formed from identification information item and operator key to be stored on the computation apparatus. It is then possible to ensure that only the use of the operator key, that is to say only user units authorized by the operator, now allows parameterization of the electrical device to be performed.

According to a further advantageous embodiment of the method according to the invention, provision may additionally be made for conclusion of the parameterization of the electrical device to be followed by the user unit being used to retrieve from the computation apparatus a software information item that indicates a version number for an up-to-date piece of device software for the electrical device, and for the user unit to display the software information item and, on a command from the user or automatically, to send an update request to the computation apparatus in order to prompt the computation apparatus to transmit the up-to-date device software to the electrical device.

In this case, the user unit and the computation apparatus can be used to prompt a software update for the device software of the electrical device following parameterization of the electrical device for the first time. As one alternative, this can be accomplished by an input by the user when the user recognizes that the device software of the electrical device is older than the currently available device software. If the user unit knows or can read in the version number of the device software of the electrical device, such a request can also be triggered automatically.

According to a further advantageous embodiment of the method according to the invention, provision may also be made for conclusion of the parameterization of the electrical device when the electrical device needs to be replaced by another electrical device to be followed by the user unit sending to the computation apparatus an identification information item for the electrical device and an identification information item for the other electrical device, and for the computation apparatus to adopt the setting values of the electrical device as setting values for the other electrical device.

This allows the user unit and the computation apparatus to be used to assist replacement of an electrical device, possibly on account of a fault. The reason is that in this case the user unit is used to record the identification information item of the electrical device to be replaced and the identification information item of the replacement device (e.g. as described above by respectively reading in and evaluating an optically recordable code) and to send both identification information items to the computation apparatus. This deregisters the device to be replaced with the computation apparatus and registers the replacement device with the computation apparatus. Furthermore, the setting values of the device to be replaced are adopted for the replacement device, so that fresh parameterization is not necessary. If the setting values of the electrical device to be replaced are also stored on the computation apparatus, this also obviates the need for e.g. the provision of a removable memory (e.g. an SD card) in the electrical device in order to be able to transfer a parameterization file from one device to the other. This is because in this case the setting values can be transferred directly from the computation apparatus to the replacement device.

If the computation apparatus stores further data relating to the device to be replaced (e.g. old measured values, etc.), then these are simultaneously logically combined with the identification information item of the replacement device, so that seamless continued operation is ensured without loss of the data previously stored in connection with the device to be replaced.

In respect of the computation apparatus, the aforementioned object is achieved by a computation apparatus that is set up to provide a parameterization program for parameterizing the electrical device, and to communicate with a user unit that is set up to input settings for the electrical device.

According to the invention, the computation apparatus is designed to execute the parameterization program for parameterizing the electrical device and, during the execution of the parameterization program, to transmit a user interface for the parameterization program for the display and user input of settings for the electrical device to the user unit.

Specifically, provision may in this case be made for the computation apparatus to be formed in a data processing cloud.

All the observations made above and below in relation to the method according to the invention apply mutatis mutandis to the computation apparatus according to the invention, and vice versa, and in particular the computation apparatus according to the invention is set up to perform the method according to the invention in any desired embodiment or a combination of any desired embodiments. Reference is also made to the advantages described in relation to the method according to the invention for the advantages of the computation apparatus according to the invention.

With reference to the user unit, the aforementioned object is achieved by a user unit for parameterizing an electrical device, which is set up to set up a communication link to a computation apparatus that provides a parameterization program for parameterizing the electrical device, and record settings made by the user that affect the electrical device.

According to the invention, the user unit is set up to interact with the computation apparatus, which executes the parameterization program for parameterizing the electrical device, such that a user interface for the parameterization program is displayed by means of the user unit for the purpose of recording user settings.

Specifically, provision may be made in this context for the user unit to be in the form of a mobile communication device or portable data processing apparatus.

All the observations made above and below in relation to the method according to the invention also apply mutatis mutandis in respect of the user unit according to the invention and vice versa, and in particular the user unit according to the invention is set up to perform the method according to the invention in any desired embodiment or a combination of any desired embodiments. Reference is also made to the advantages described in relation to the method according to the invention for the advantages of the user unit according to the invention.

Finally, the aforementioned object is also achieved by a system for parameterizing an electrical device having a computation apparatus, which provides a parameterization program for parameterizing the electrical device, and a user unit. In other words, with the above and other objects in view there is also provided, in accordance with the invention, a system for parameterizing an electrical device. The system includes the following:

a computation apparatus configured to provide a parameterization program for parameterizing the electrical device, the computation apparatus being configured to communicate with a user unit that is configured to input settings for the electrical device; to execute the parameterization program for parameterizing the electrical device; and during the execution of the parameterization program, to transmit a user interface for the parameterization program to be displayed by the user unit for acquiring user input of settings for the electrical device at the user unit; and a user unit configured to set up a communication link to a computation apparatus that provides a parameterization program for parameterizing the electrical device; to acquire settings made by the user that affect the electrical device; and to interact with the computation apparatus, which executes the parameterization program for parameterizing the electrical device, and wherein the user unit displays a user interface for the parameterization program for acquiring user settings;

wherein the computation apparatus and the user unit are configured to carry out and execute the above-summarized parameterization method.

All the observations made above and below in relation to the method according to the invention also apply mutatis mutandis in respect of the system according to the invention and vice versa, and in particular the system according to the invention is set up to perform the method according to the invention in any desired embodiment or a combination of any desired embodiments. Reference is also made to the advantages described in relation to the method according to the invention for the advantages of the system according to the invention.

The invention is explained in more detail below using an exemplary embodiment. The specific refinement of the exemplary embodiment is by no means intended to be understood as restrictive for the general refinement of the method according to the invention, the computation apparatus according to the invention, the user unit according to the invention and the system according to the invention; rather, individual refinement features of the exemplary embodiment can be combined in arbitrary manner with one another and with the features described above without restriction.

The construction and method of operation of the invention, together with additional objects and advantages, thereof will be best understood from the following description of specific embodiments when read in connection with the accompanying drawings.

DETAILED DESCRIPTION OF THE INVENTION

Figure 1:
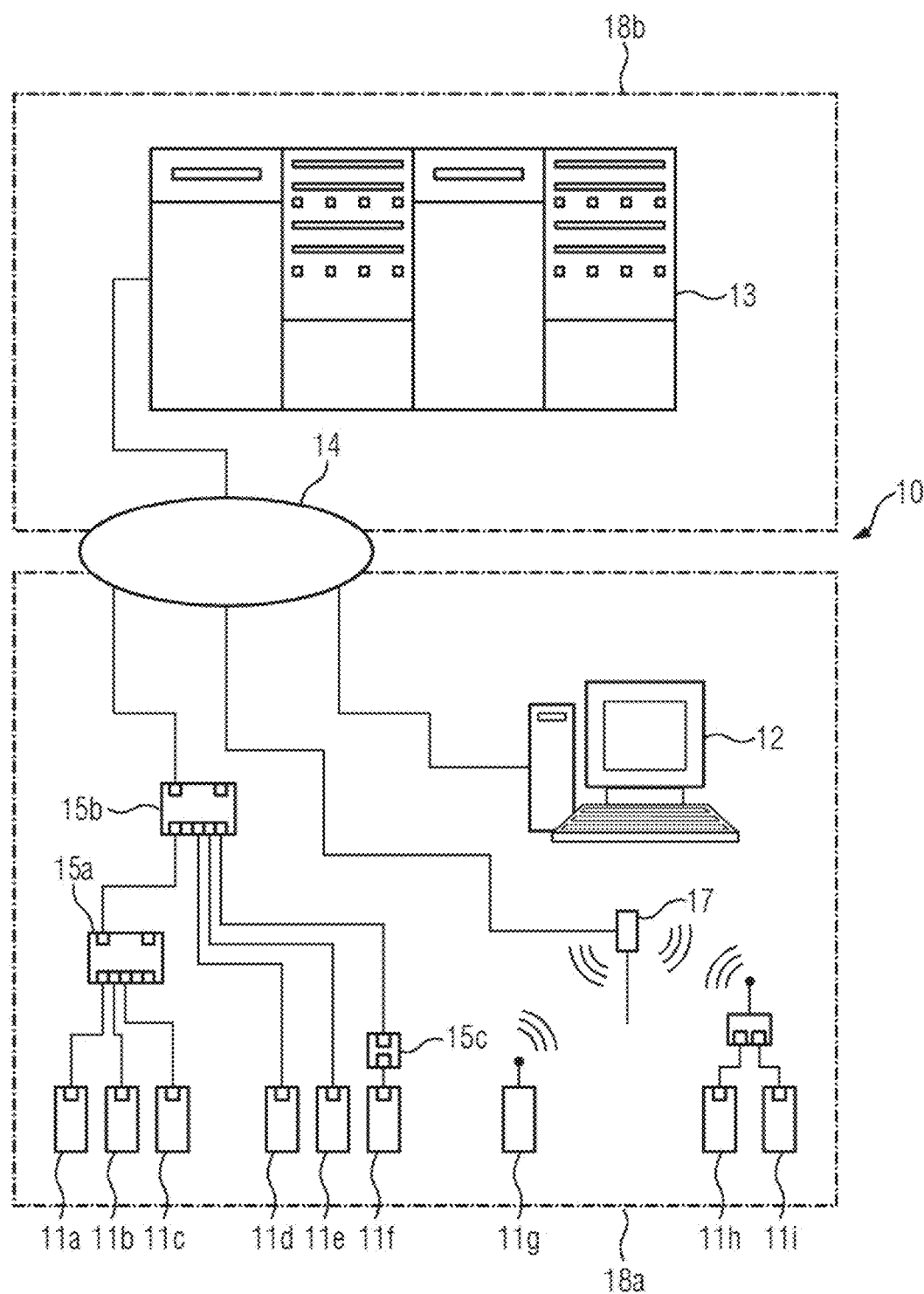
FIG. 1 shows a schematic view of a system having a computation apparatus and electrical devices.

Referring now to the figures of the drawing in detail and first, particularly, to FIG. 1 thereof, there is shown a schematic view of a system 10 for observing and/or controlling an installation. The latter is not shown in FIG. 1 for the sake of clarity. By way of example, the installation may be an electrical power supply system or a switching station for a power supply system. Such an installation has single components, e.g. lines, cables, switches, transformers, generators, motors, converters, electrical loads, electrical energy generators, electrical stores, etc., the state of which is recorded using electrical devices 11a-i by picking up appropriate measured values and/or is influenced by performing particular actions (e.g. actuating a switch). The electrical devices 11a-i may be e.g. sensors or actuators or what are known as IEDs. For observation and/or control of the installation, there is additionally a control center arrangement 12 provided, which may be e.g. one or more data processing apparatuses in a control center. The control center arrangement 12 forms the interface to the operating personnel of the installation and is used to evaluate and display operating states for the installation and/or to receive or independently produce control commands for influencing the operating state of the installation.

The system 10 furthermore comprises a computation apparatus 13 that is connected for communication purposes both to the control center arrangement 12 and to the electrical devices 11a-i. The computation apparatus 13 is formed e.g. in a data processing cloud. By way of example, the data processing cloud can be provided by a server installation or a computer center. In the example shown in FIG. 1, the electrical devices 11a-i, the control center arrangement 12 and the computation apparatus 13 are connected at least indirectly via a communication network 14, which may be, say, a LAN (local area network), a WAN (wide area network), an intranet or the Internet or a combination of different networks (e.g. LAN and Internet).

In one embodiment, the control center arrangement 12 or functions of the control center arrangement 12 may be formed wholly or to some extent by the computation apparatus 13. In the case described above, it would therefore consequently be possible for functions of the control center apparatus 12 to be carried out in the data processing cloud.

The single electrical devices 11a-i are connected to the computation apparatus 13 indirectly via the communication network 14. Specifically, the electrical devices 11a-c are connected to a first switch 15a that is in turn connected to a second switch 15b. This second switch 15b also has the further electrical devices 11d-f connected to it, the electrical devices 11d and 11e being connected to the switch 15b directly and the electrical device 15f being connected to the switch 15b via a communication coupler 15c. This is because while the electrical devices 11a-e each comprise a suitable interface 16a (e.g. an Ethernet interface) for direct coupling to a communication medium (e.g. an Ethernet cable) connected to the switch 15a or 15b, the electrical device 11f lacks such an interface 16a. Instead, the electrical device 11f has another interface 16b (e.g. a serial interface). The communication coupler 15c has a corresponding interface 16b that connects it to the electrical device 11f. Furthermore, the communication coupler 15c also comprises an interface 16a that is suitable for connection to the switch 15b. The communication coupler 15c is therefore used to communicatively couple the electrical device 11f to the switch 15b and, to this end, performs an appropriate communication conversion between the two interfaces 16a and 16b. Finally, the switch 15b is connected to the communication network 14.

Furthermore, the communication network 14 has a communication access apparatus 17 connected to it that provides an access point for wireless communication links. By way of example, the communication access apparatus 17 is a WiFi router of appropriate design for operation in installation environments, or a WLAN access point. The communication access apparatus 17 has the electrical devices 11g-i connected to it, wherein the electrical device 11g has a dedicated communication apparatus for wireless communication and is thereby connected directly to the communication access apparatus 17. By contrast, the electrical devices 11h and 11i have no dedicated communication apparatuses for wireless communication and are instead connected to a suitable communication coupler 15d via cable connections. Said communication coupler provides an interface for wireless connection to the communication access apparatus 17. The computation apparatus 13 is likewise connected to the communication network 14. This connection can be set up directly or indirectly (e.g. via a DSL link). In this manner, the computation apparatus 13 is also connected to the electrical devices 11a-i. To this end, the computation apparatus 13 has a suitable interface (e.g. one or more physical Ethernet interfaces).

In connection with the explanations below, particularly in respect of parameterization of electrical devices, not only the electrical devices 11*a-i* already mentioned but also communication devices, such as the switches 15*a*, 15*b*, the communication coupler 15*c* and the communication access apparatus 17, are also intended to be regarded as electrical devices.

Besides the wired or wireless connection of the electrical devices 11*a-i*, in the form of a communication network formed in a tree structure or by means of a communication access apparatus for wireless communication, that is shown in FIG. 1, it is also possible for other connection options to be used. By way of example, the single electrical devices 11*a-i* may each be connected to the communication network 14 directly, i.e. without the interposition of an additional communication structure. Direct connection of the single electrical devices 11*a-i* to the computation apparatus 13 is also conceivable, provided that the latter provides a sufficient quantity of suitable interfaces for this purpose.

The control center arrangement 12 is likewise connected to the communication network 14. This connection can be set up directly or indirectly (e.g. via a DSL link). In this manner, the computation apparatus 13 is also connected to the control center arrangement 12. To this end, the control center arrangement 12 has a suitable interface (e.g. a physical Ethernet interface).

Between the electrical devices 11*a-i* and the computation apparatus 13, messages are transmitted that include, by way of example, measured values from electrical devices in the form of sensors or control commands for electrical devices in the form of actuators. These messages may be designed on the basis of different communication protocols that are supported by the respective electrical devices 11*a-i*. The transport or transmission protocol chosen may be TCP/IP, for example, in order to be able to use prevalent Internet technology for the transmission of the messages. For the purpose of communication, the electrical devices can have communication addresses firmly prescribed on an individual basis, for example, e.g. IP addresses based on the IPv6 standard. The computation apparatus 13 stores the data received with the messages from the electrical devices and logically combines them with a designation for the respective electrical devices.

Between the computation apparatus 13 and the control center arrangement 12, messages are likewise transmitted that include values indicating control commands for the electrical devices 11*a-i* that are generated by the control center by virtue of control action by the operating personnel or automatically, or a state of one or more components of the installation, for example. These messages may be designed e.g. on the basis of a telecontrol protocol that is supported by the control center 12. The transport or transmission protocol chosen may be TCP/IP, for example, in order to be able to use prevalent Internet technology for the transmission of the messages too.

The computation apparatus 13 provides suitable interfaces and communication protocols for the control center arrangement 12 and the electrical devices 11*a-i*. Since the computation apparatus 13 is formed in a data processing cloud, appropriate programming of the computation apparatus 13 allows simple and flexible adjustment to suit the respectively required communication protocols. Adjustments to the electrical devices 11*a-i* or the control center arrangement 12 are not necessary, on the other hand.

The computation apparatus 13 is firstly used as a communication gateway, i.e. it performs protocol adjustment for the messages between the electrical devices and the control center arrangement. Furthermore, the computation apparatus 13 can use the data included in the messages from the electrical devices also to perform independent automation functions, e.g. to trigger an action itself when a threshold value is exceeded. To perform the respective functions, the computation apparatus 13 has one or more application modules with appropriate programming.

By way of example, the computation apparatus 13 may be situated outside the range of influence 18*a*, indicated in FIG. 1, of the operator of the electrical devices 11*a-h* and instead be associated with an operator (which is different than the operator of the electrical devices) of the data processing cloud, whose range of influence 18*b* is likewise indicated in FIG. 1. In this manner, the operator of the data processing cloud can provide the functions of the computation apparatus 13 for the operator of the electrical devices as a service. Alternatively, the data processing cloud can naturally also be operated by the same operator as the electrical devices.

Figure 2:
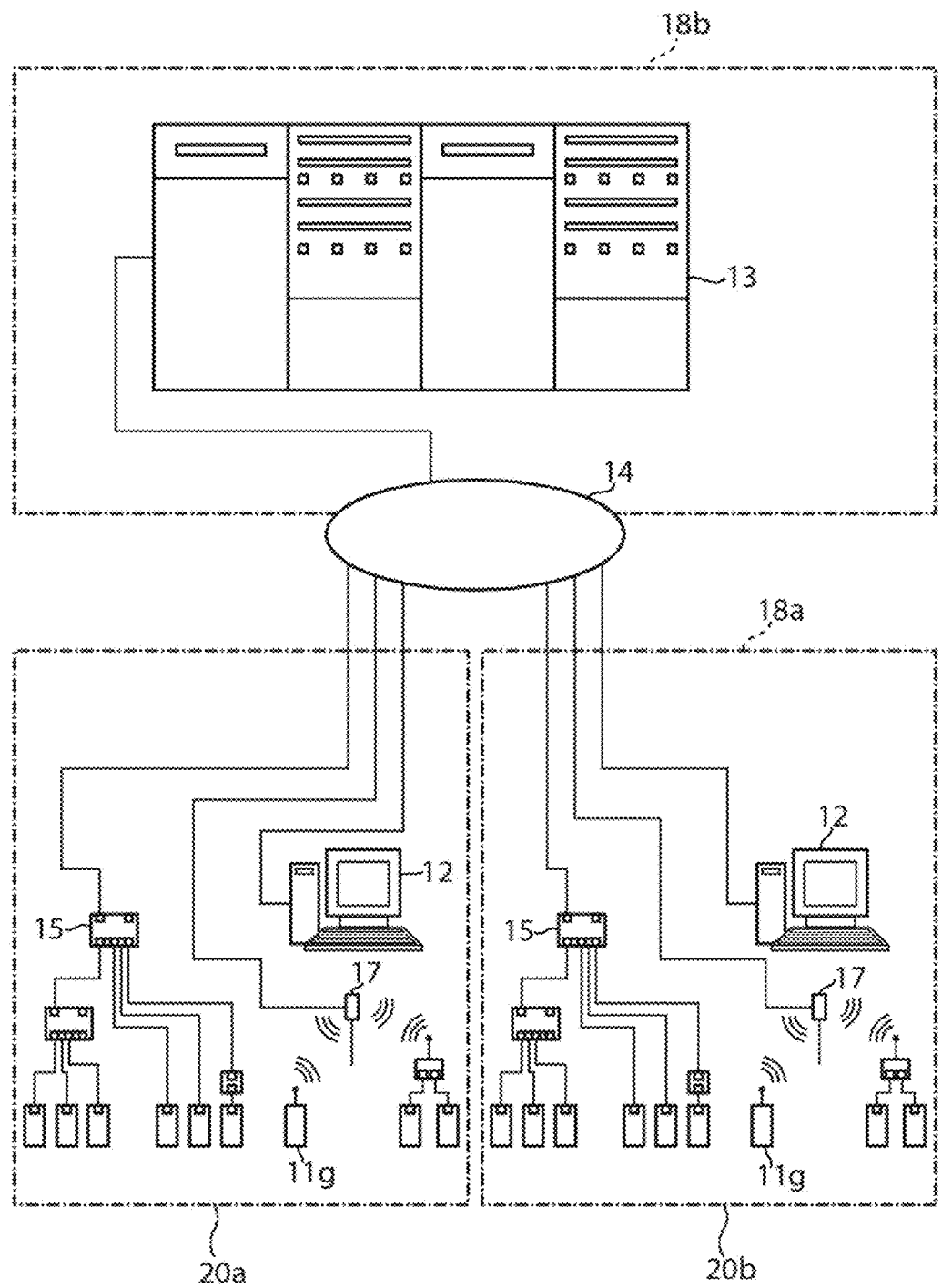
FIG. 2 shows a schematic view of a computation apparatus and electrical devices of multiple installations.

FIG. 2 shows a further exemplary embodiment of a system having a computation apparatus 13. The general manner of operation of the computation apparatus 13 and also its communication links to electrical devices and control center arrangements corresponds to the manner of operation already explained in relation to FIG. 1. In the exemplary embodiment shown in FIG. 2, however, the data processing cloud is connected to two installations 20*a* and 20*b* having respective electrical devices. Therefore, the computation apparatus 13 formed in the data processing cloud has two separate data areas that are protected from one another in respect of any access operations, so that no read and write access operations can take place between the individual data areas, for example. Furthermore, the data that are present in the different data areas may be encrypted with different operator keys that are individually associated with the respective operator of the installations 20*a*, 20*b* in order to increase data integrity further. In this embodiment, the computation apparatus 13 is in a form such that the functionalities and actions respectively provided and performed for the two installations 20*a*, 20*b* are each carried out only in a data area that is associated with the relevant installation or the operator of the relevant installation. Hence, the computation apparatus 13 can provide and carry out services for more than one installation in parallel. In this case, the installations 20*a* and 20*b* can be operated by the same operator or by different operators. The data processing cloud can be operated by one of the installation operators or a third party.

It goes without saying that the computation apparatus 13 is not restricted to operation for up to two installations; rather, any number of installations may be connected to the computation apparatus 13, provided that the service provided by the data processing cloud so permits.

Startup, replacement, altered ambient conditions or functional requirements and care and maintenance require the electrical devices to be parameterized. This involves device settings being stipulated for the operation of the electrical devices. The procedure for parameterization is explained by way of example below with reference to FIGS. 3 to 6.

Figure 3:
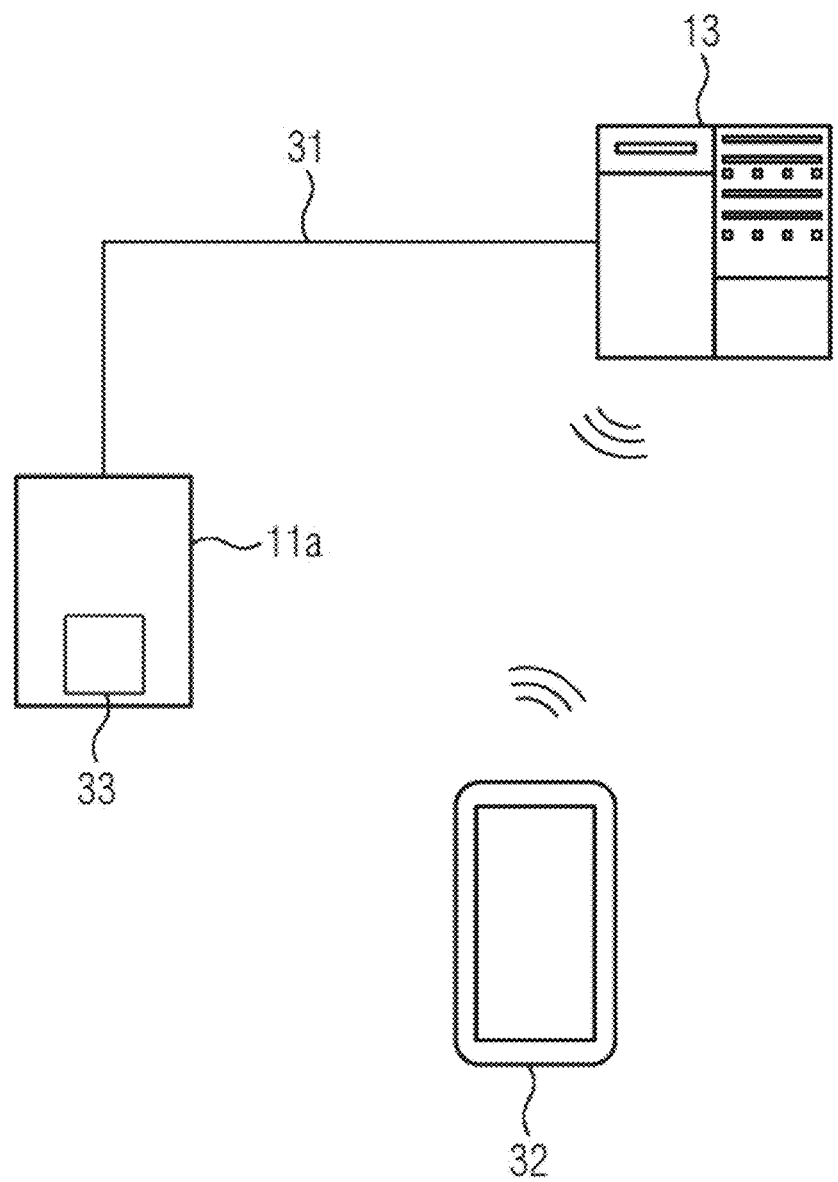
FIG. 3 shows a schematic view of a system for parameterizing an electrical device.

In this regard, FIG. 3 shows an example of an electrical device 11*a*. The electrical device 11*a* is connected to the computation apparatus 13 via a communication link 31, which is indicated only schematically and which may be designed in accordance with the explanations relating to FIG. 1, for example.

Parameterization of the electrical device 11*a* furthermore involves the use of a user unit 32, which may be a smartphone or a portable data processing apparatus (laptop, tablet, etc.), for example. The user unit has an installed application program (e.g. what is known as an "APP") that is suitable for displaying a user interface for a parameterization program that is executed on the computation apparatus 13 and recording settings by the user in this regard. By way of example, the application program may be a browser. Alternatively, it may be in the form of a specific other program.

The user unit 32 cooperates with the computation apparatus 13 to perform the steps for parameterizing the electrical device 11*a* that are required when installing and starting up the electrical device 11*a*. To this end, the user unit 32 is connected to the computation apparatus 13, for example via a wireless communication link (mobile radio, WLAN, WiFi, etc.) that is indicated only schematically in FIG. 3. By contrast, the user unit 32 and the electrical device 11*a* do not need to have a communication link between them.

An exemplary embodiment of a method for parameterizing an electrical device is explained below with reference to FIG. 4.

Figure 4:
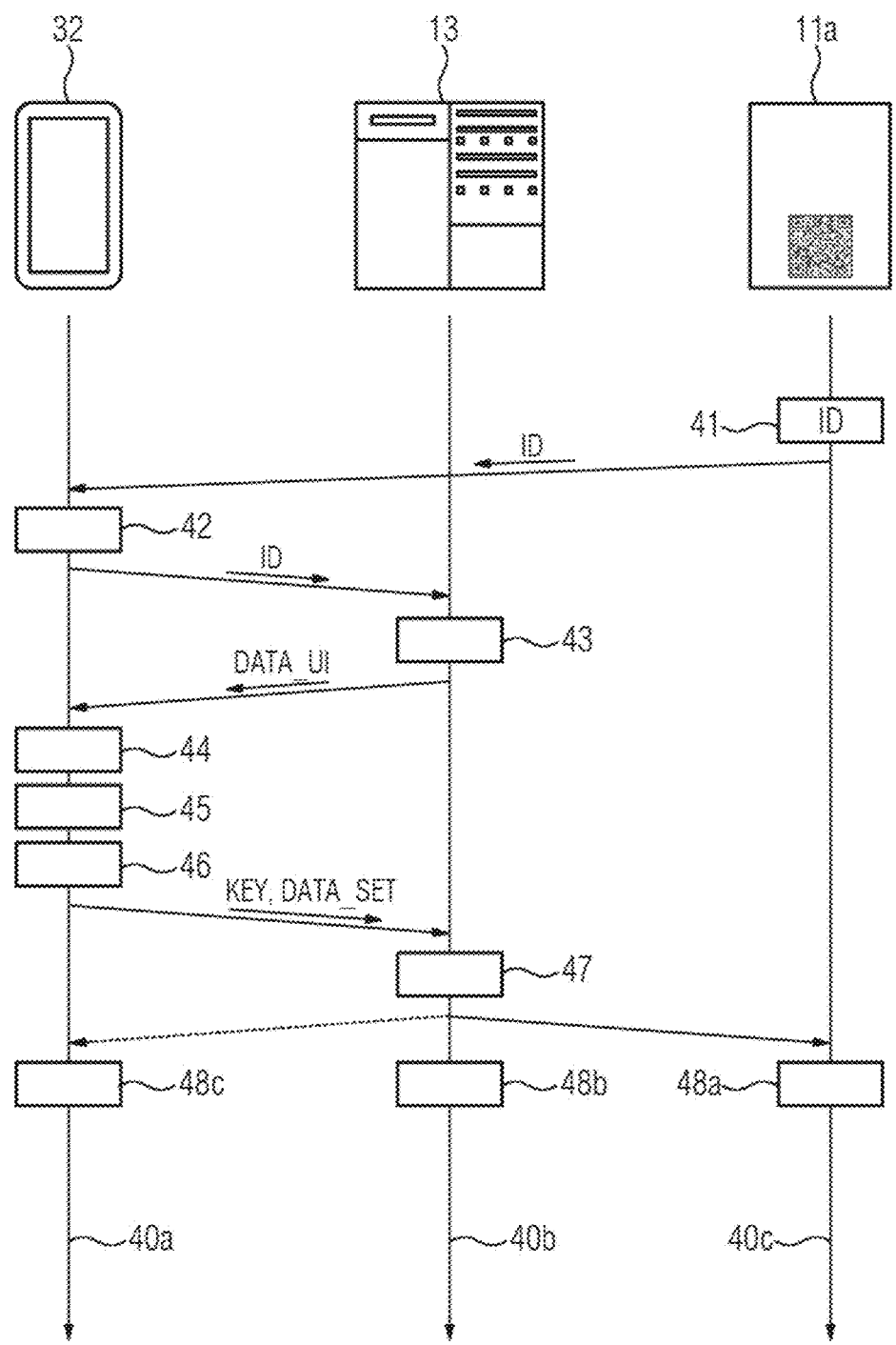
FIG. 4 shows a flow diagram illustrating a method for parameterizing an electrical device.

In this regard, FIG. 4 shows a flow chart for such a method. In addition, FIG. 4 shows three time lines 40*a-c*. The time line 40*a* shows the method steps that are carried out in connection with the user unit 32, the time line 40*b* shows the method steps that are carried out in connection with the computation apparatus 13 and time line 40*c* shows the method steps that are carried out in connection with the electrical device 11*a*.

First of all, in step 41, the electrical device 11*a* provides an identification information item ID that allows explicit identification of the electrical device 11*a*. This may be e.g. a serial number, an explicit device name or an explicit communication address (e.g. MAC address, IP address). Preferably, such an identification information item ID is coded by means of an optically readable code 33 (cf. FIG. 3) that is fitted on the electrical device (e.g. a bar code or QR code that is printed on or attached by means of a sticker) or is presented by means of a display apparatus of the electrical device. By way of example, provision may be made for electrical devices in the form of intelligent sensors and actuators to be provided with a bar code or QR code ex-works that is used to code the identification information item ID in the form of a serial number for the device.

In a subsequent step 42, the identification information item ID is recorded and evaluated by the user unit 32. By way of example, this can be accomplished by dint of optical read-in, for example, by means of a camera of the user unit 32. In this case, the user unit decodes the optically read-in code and ascertains the identification information item ID therefrom. It goes without saying that the identification information item ID can also be recorded by the user unit 32 in another way, for example by dint of manual user input or by means of near field communication (infrared, Bluetooth, near field communication—NFC).

After the identification information item has been recorded, the user unit 32 sets up a communication link to the computation apparatus 13 and transmits the identification information ID to the computation apparatus 13.

The computation apparatus 13 then carries out step 43 and in so doing uses the received identification information item ID to select a parameterization program that is suitable for the electrical device from a plurality of parameterization programs or uses the received identification information item ID to adjust a universal parameterization program such that it is suitable for parameterizing the electrical device 11*a*. When this parameterization program is executed by the computation apparatus 13, first data (DATA_UI) are produced that are suitable for producing a user interface for the parameterization program. These first data may have e.g. a browser-readable data format (HTML, XML, etc.) and be used to produce a user interface that displays to a user in situ (i.e. in proximity to the electrical device 11*a*) all relevant device settings that need to be input when the device is installed. The first data are then transmitted to the user unit 32.

In step 44, the user unit 32 uses the application program to produce the user interface and displays the latter on a display apparatus (e.g. display, monitor). The user interface allows a user to input all the relevant device settings.

In a next step 45, the user unit 32 records settings for the electrical device that are input by the user via the user interface. By way of example, these may comprise, inter alia:
name of the device;
name of a station or installation in which the device is installed;
name of the components of the station or installation that are associated with the device (e.g. electrical lines);
geographical installation location;
dynamic parameters that become known only upon assembly (e.g. current threshold values).

The application program allows the user interface for the parameterization to run e.g. as browser pages within the application program. This means that the user interface can be adjusted quickly and in a simple manner, for example in the event of firmware changes on the electrical device. Updating (e.g. an update) of the application program on the user unit is not necessary in this case, since all adjustments are made on the computation apparatus 13.

If the user unit 32 has a geosensor (e.g. a GPS module), the application program can furthermore record the geographical information item via the geosensor and enter it as a setting into the user interface (step 46).

The settings are then transmitted from the user unit 32 to the computation apparatus 13 as second data (DATA_SET). By way of example, the second data are browser pages in HTML or XML format that are filled in by the user.

The computation apparatus 13 receives the second data and produces setting values for the electrical device from the included settings (step 47). By way of example, the setting values can be provided by entries in a parameterization template that is specific to the electrical device. In the simplest case, the electrical device is also capable of reading the second data without further alteration, and the second data can then be adopted as setting values directly (e.g. in the form of an XML file).

Next, a parameterization file that comprises the setting values is transmitted from the computation apparatus 13 to the electrical device 11*a*. The electrical device 11*a* adopts the device settings included in the setting values and thus concludes the parameterization (step 48*a*). The computation apparatus also stores the parameterization file locally (step 48*b*). The parameterization file can optionally also be transmitted to the user unit 32 and stored thereon (step 48*c*).

Following conclusion of the parameterization, the electrical device 11*a* can go into operation and in so doing interchange messages with the computation apparatus as described above.

With the second data DATA_SET, the user unit 32 can also transmit an operator key KEY, indicating the operator of the electrical device, to the computation apparatus 13. This operator key is used to identify the operator of the electrical device 11*a* on the computation apparatus 13. The computation apparatus 13 then stores the parameterization file in step 48*c* by using the operator key such that only the operator and if need be electrical devices of the operator have access thereto. Furthermore, the identification information item of the electrical device is logically combined with the operator key, so that all data sent to the computation apparatus 13 during operation of the electrical device are stored in a manner protected using the operator key. This ensures that the information items and data of the device can be read and edited, e.g. by means of the control center apparatus 12 (cf. FIG. 1), only by the operator to which these devices actually belong.

Figure 5:
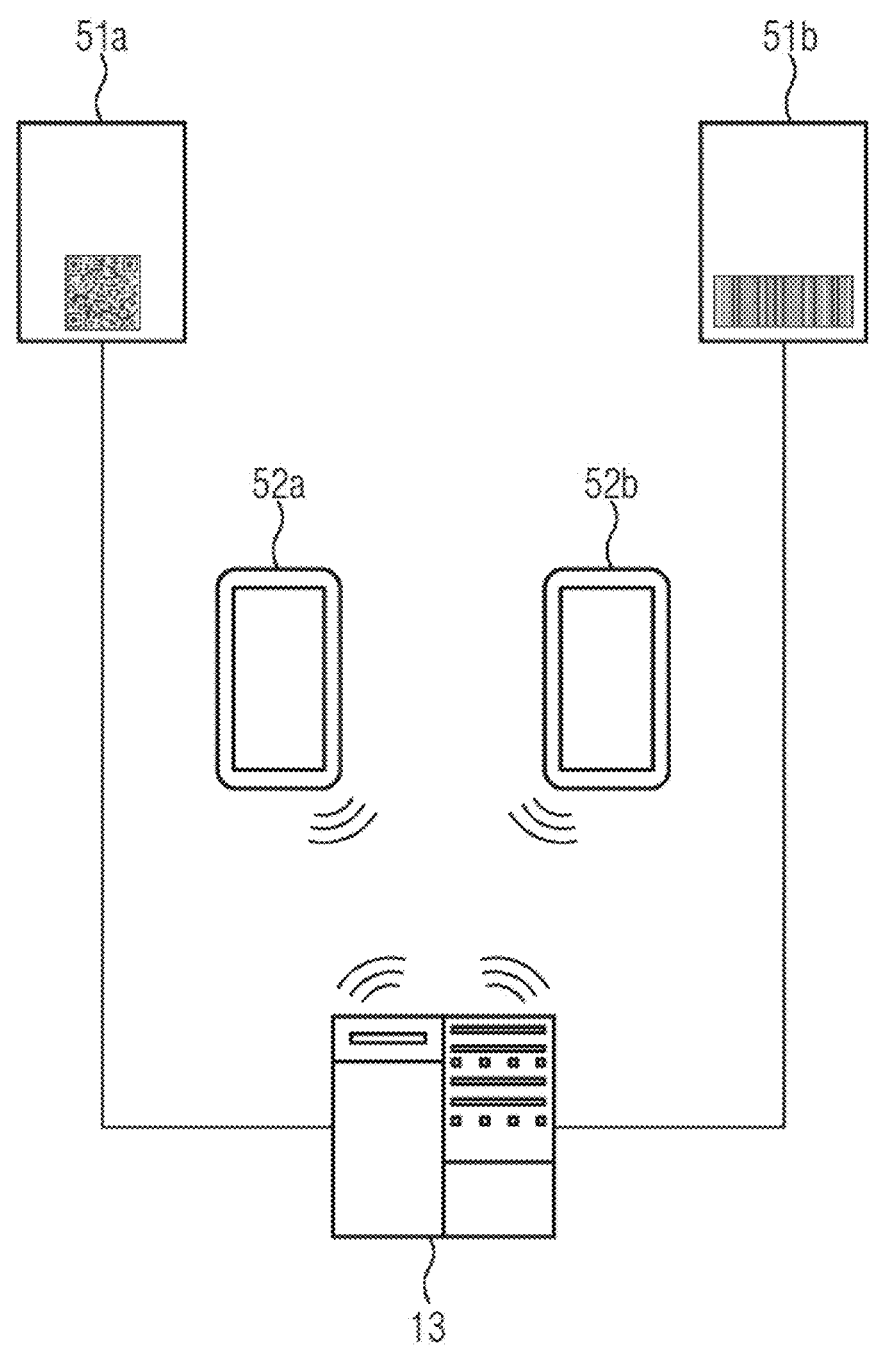
FIG. 5 shows a schematic view of a system for parameterizing two electrical devices.

This context is explained schematically in FIG. 5. FIG. 5 shows a computation apparatus that is connected to two electrical devices 51*a* and 51*b*. The electrical device 51*a* belongs to a first installation, which is not shown in FIG. 5, and is operated by a first operator. The electrical device 51*b* belongs to a second installation, which is not shown in FIG. 5, and is operated by a second operator, which is different than the first operator. As illustrated above, the computation apparatus now has two different data areas that are isolated from one another and protected against access operations on one another, one of said data areas being associated with the first operator and the other being associated with the second operator. In this regard, the two data areas are protected by using respective operator keys. Each operator furthermore has an assigned user unit 52*a* or 52*b*. In this regard, the user unit 52*a* comprises the operator key of the first operator, while the user unit 52*b* has the operator key of the second operator. The computation apparatus 13 now uses the separate data areas to ensure that the data of the first electrical device are stored only in that data area that is associated with the first operator and can be read and edited only by the first operator if it knows the first operator key. Furthermore, the first user unit 52*a* can only perform parameterization on the first electrical device 51*a*, since it only knows the first operator key. Accordingly, the data of the second electrical device are stored only in that data area that is associated with the second operator, and can be read and edited only by the second operator if it knows the second operator key. Furthermore, the second user unit 52*a* can only perform parameterization on the second electrical device 51*a*, since it only knows the second operator key. In this manner, a single computation apparatus 13 can be used to operate installations of multiple operators. The number of operators is naturally not limited to two in this case.

The allocation of the key to the application program on the user unit can be effected e.g. in a manner similar to key assignment methods that are known from the field of online banking.

The security of the aforementioned authentication mechanism can be increased still further if the computation apparatus interacts with a sales platform that can be used to sell new electrical devices to the operator, or forms such a sales platform. In this case, the identification information item of a new device could be logically combined with the operator key of the operator on delivery itself. In that case, the parameterization could be performed only by authorized user units that likewise have the operator key.

Figure 6:
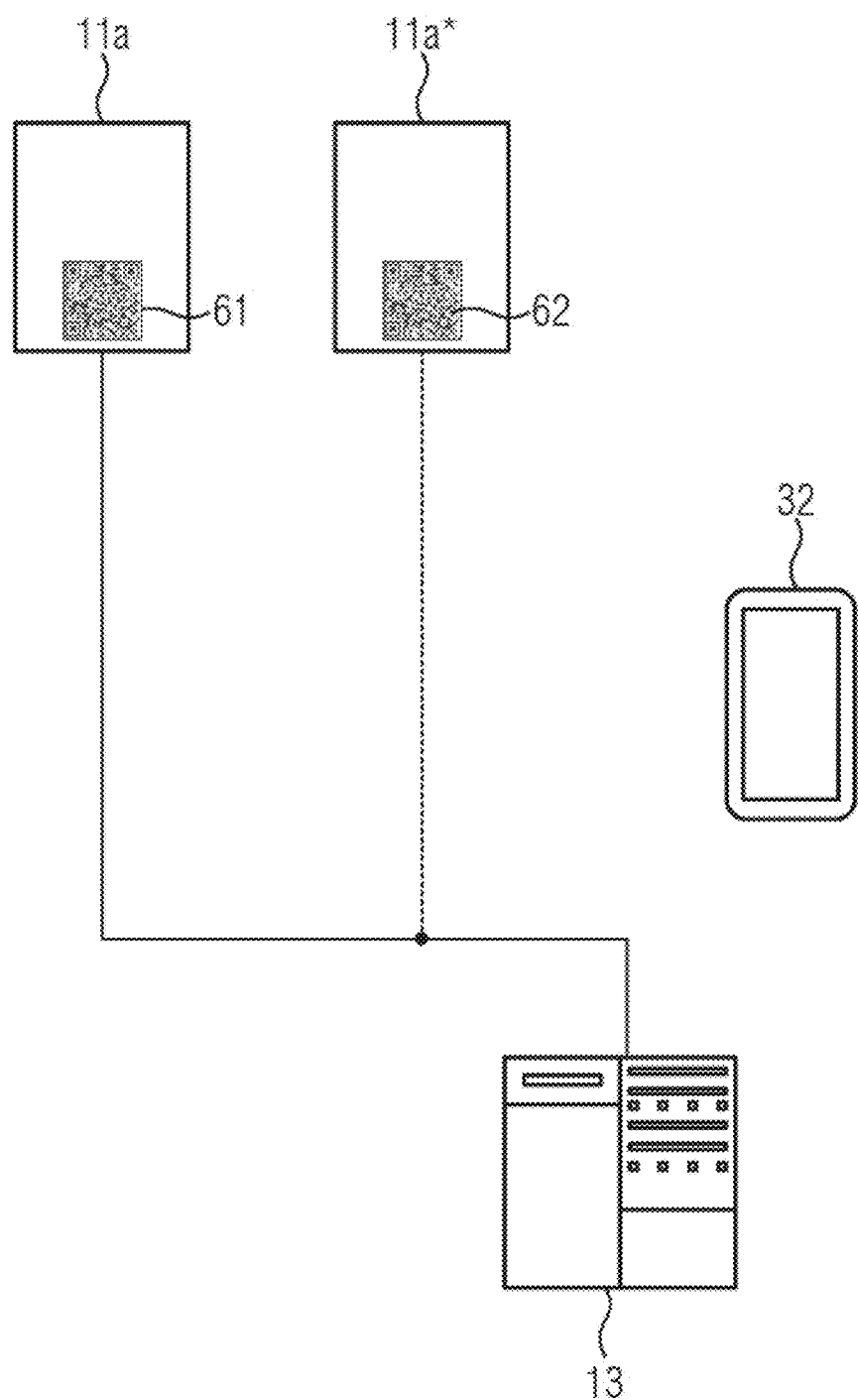
FIG. 6 shows a schematic view of a system to explain the parameterization of a replacement device.

Finally, FIG. 6 shows a schematic illustration of a system having a computation apparatus 13, a user unit 32 and an electrical device 11*a* that—e.g. on account of a fault—is intended to be replaced by another electrical device 11*a. In this case, the computation apparatus 13, in interaction with the user unit 32**, supports the procedure explained below.

First of all, an identification information item for each of the two electrical devices, that is to say the electrical device 11*a* to be replaced and the replacement device 11*a, is recorded. By way of example, this can be accomplished by dint of optical recording of QR codes 61, 62, attached to the two devices 11***a*, 11*a, by means of the user unit 32. The application program on the user unit 32 is additionally used to record an input by the user that indicates that the electrical device 11***a* is intended to be replaced by the other electrical device 11*a**. The order of the steps just described can be chosen arbitrarily in this case.

The user unit 32 then sends the identification information items of both devices 11*a*, 11*a to the computation apparatus 13. The computation apparatus 13 can optionally perform a check to determine whether the other device 11*a can actually undertake the functions of the previous device 11*a*. If this is the case, then the computation apparatus 13 produces the user interface (e.g. in the form of browser pages) that is required for parameterizing the other device 11*a. In this case, however, the setting values of the previous device 11***a* are adopted and already entered. The replacement device 11*a is then connected to the computation apparatus 13 (e.g. by dint of connection to a communication network that is used for communication with the computation apparatus). The connection between the replaced device 11***a* and the computation apparatus 13 can be broken.

If no further settings are required, the computation apparatus 13 can transmit the associated parameterization file directly to the replacement device 11*a and/or store the parameterization file for the replacement device 11*a. Optionally, it is possible for clearance from the user of the user unit 32 to be obtained beforehand via the user interface presented thereon. In this case, it is also possible for the operator key to be requested by the user unit 32, for example.

If not all required setting values are available through adoption from the device 11*a* to be replaced, the missing settings are requested by means of the user interface presented on the user unit 32 and are transmitted to the computation apparatus 13. The rest of the parameterization takes place as already described above.

Any data already stored on the computation apparatus 13 in connection with the old device 11*a*, e.g. measured values, status values, are then associated with the identification information item of the new device 11*a**.

Furthermore, the user unit 32 can also be used to update a piece of device software for an electrical device. This involves the following steps being performed: first of all, the identification information item of an electrical device is recorded (e.g. by reading in a bar code/QR code). This identification information item is transmitted together with a device software update request from the user unit 32 to the computation apparatus 13. The computation apparatus 13 uses the transmitted identification information item to ascertain the current device software version and sends this to the user unit. There, it is displayed to the user. Furthermore, a version of the device software that is currently present on the device can be displayed. On request by the user or automatically, the user unit 32 can then ask the computation apparatus 13 to carry out a software update for the electrical device.

Alternatively, provision may also be made for the user to use the user unit 32 to instruct the computation apparatus 13 to transmit updates for the device software to the respective electrical device automatically. In this case, clearance by the user is not necessary.

The invention claimed is:

1. A method for parameterizing an electrical device, the method which comprises:
    establishing a communication link between a user unit and a computation apparatus, and providing with the computation apparatus a parameterization program for parameterizing the electrical device;

executing the parameterization program for parameterizing the electrical device by the computation apparatus;

displaying a user interface for the parameterization program at the user unit and acquiring with the user unit settings made at a user end that affect the electrical device; and using the acquired settings to form setting values for parameterizing the electrical device, and producing a parameterization file containing the setting values for the electrical device;

storing in the user unit an explicit digital operator key associated with an operator of the electrical device, and sending the key from the user unit to the computation apparatus; and using the operator key in the computation apparatus to store one or more of the following in encrypted form: the setting values, the parameterization file, further information items relating to the electrical device, and/or data received from the electrical device during operation; or storing, with the computation apparatus, one or more of the following: the setting values, the parameterization file, further information items relating to the electrical device, and/or data received from the electrical device during operation in an access-protected area using the operator key.

2. The method according to claim 1, wherein an execution of the parameterization program prompts the computation apparatus to transmit first data to the user unit that are suitable for producing the user interface for the parameterization program, and the method further comprises:

causing the user unit to use the received first data to produce and display the user interface for recording the user settings;

transmitting second data, which indicate the acquired settings made by the user, from the user unit to the computation apparatus;

at the computation apparatus, using the received second data to form the setting values for the electrical device; and at the computation apparatus, using the formed setting values to produce the parameterization file.

3. The method according to claim 1, which comprises transmitting at least portions of the parameterization file from the computation apparatus to the electrical device.

4. The method according to claim 1, which comprises:

using the user unit to record an identification information item for the electrical device;

transmitting the identification information item of the electrical device from the user unit to the computation apparatus; and with the computation apparatus, adjusting the parameterization program using the identification information item such that the parameterization program is suitable for parameterizing the device, or selecting from a plurality of parameterization programs, a parameterization program that is suitable for parameterizing the device.

5. The method according to claim 4, which comprises using the identification information item with the computation apparatus to ascertain further information items relating to the electrical device.

6. The method according to claim 1, which comprises providing the computation apparatus in a data processing cloud.

7. The method according to claim 1, wherein:

acquisition of a new electrical device by the operator prompts the computation apparatus to logically combine an identification information item of the new electrical device with an operator key of the operator and to store the identification information item of the new electrical device and the operator key of the operator; and parameterization of the new electrical device prompts the computation apparatus to accept only such settings for the new electrical device as come from a user unit that has the same operator key.

8. The method according to claim 1, wherein:

a conclusion of the parameterization of the electrical device is followed by the user unit being used to retrieve from the computation apparatus a software information item that indicates a version number for an up-to-date piece of device software for the electrical device; and the user unit displays the software information item and, on a command from the user or automatically, sends an update request to the computation apparatus in order to prompt the computation apparatus to transmit the up-to-date device software to the electrical device.

9. The method according to claim 1, wherein:

a conclusion of the parameterization of the electrical device, when the electrical device needs to be replaced by another electrical device, is followed by the user unit sending to the computation apparatus an identification information item for the electrical device and an identification information item for the other electrical device; and the computation apparatus adopts the setting values of the electrical device as setting values for the other electrical device.

10. A computation apparatus for parameterizing an electrical device, the computation apparatus being configured:

to provide a parameterization program for parameterizing the electrical device; and to communicate with a user unit that is configured to input settings for the electrical device;

to execute the parameterization program for parameterizing the electrical device; and during the execution of the parameterization program, to transmit a user interface for the parameterization program to be displayed by the user unit for acquiring user input of settings for the electrical device at the user unit; and to receive, from the unit user, an explicit digital operator key associated with an operator of the electrical device;

to use the operator key to store one or more of the following in encrypted form: the setting values, the parameterization file, further information items relating to the electrical device, and/or data received from the electrical device during operation; or to store one or more of the following: the setting values, the parameterization file, further information items relating to the electrical device, and/or data received from the electrical device during operation in an access-protected area using the operator key.

11. The computation apparatus according to claim 10, configured in a data processing cloud.

12. A user unit for parameterizing an electrical device, the user unit being configured:

to set up a communication link to a computation apparatus that provides a parameterization program for parameterizing the electrical device;

to acquire settings made by the user that affect the electrical device;

to interact with the computation apparatus, which executes the parameterization program for parameterizing the electrical device, and wherein the user unit displays a user interface for the parameterization program for acquiring user settings; and to store in the user unit an explicit digital operator key associated with an operator of the electrical device, and to send the explicit digital operator key to the computation apparatus for parametrization of the electrical device.

13. The user unit according to claim 12, wherein the user unit is a mobile communication device or a portable data processing apparatus.

14. A system for parameterizing an electrical device, the system comprising:

a computation apparatus configured to provide a parameterization program for parameterizing the electrical device, the computation apparatus being configured:

to communicate with a user unit that is configured to input settings for the electrical device;

to execute the parameterization program for parameterizing the electrical device; and during the execution of the parameterization program, to transmit a user interface for the parameterization program to be displayed by the user unit for acquiring user input of settings for the electrical device at the user unit;

a user unit configured:

to set up a communication link to a computation apparatus that provides a parameterization program for parameterizing the electrical device; and to acquire settings made by the user that affect the electrical device;

to interact with the computation apparatus, which executes the parameterization program for parameterizing the electrical device, and wherein the user unit displays a user interface for the parameterization program for acquiring user settings;

wherein the computation apparatus and the user unit are configured to carry out and execute the method according to claim 1.

* * * * *